Sept. 19, 1961  M. S. JODOCK  3,000,533
ENGINE INLET PLUG
Filed April 24, 1959  2 Sheets-Sheet 1

INVENTOR.
Marvin S. Jodock
BY
Thomas W. Secrest
ATTORNEY

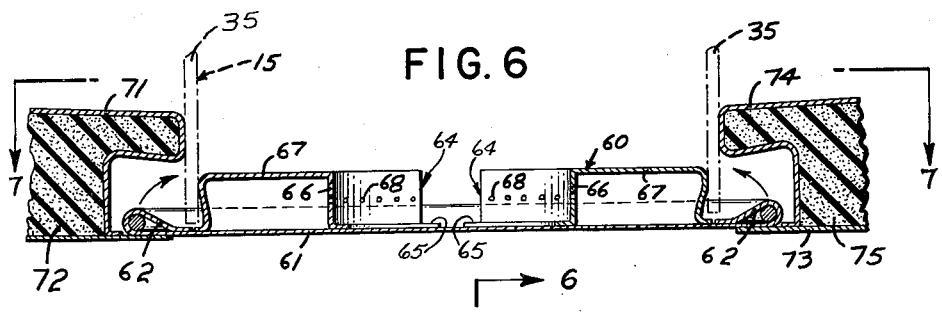
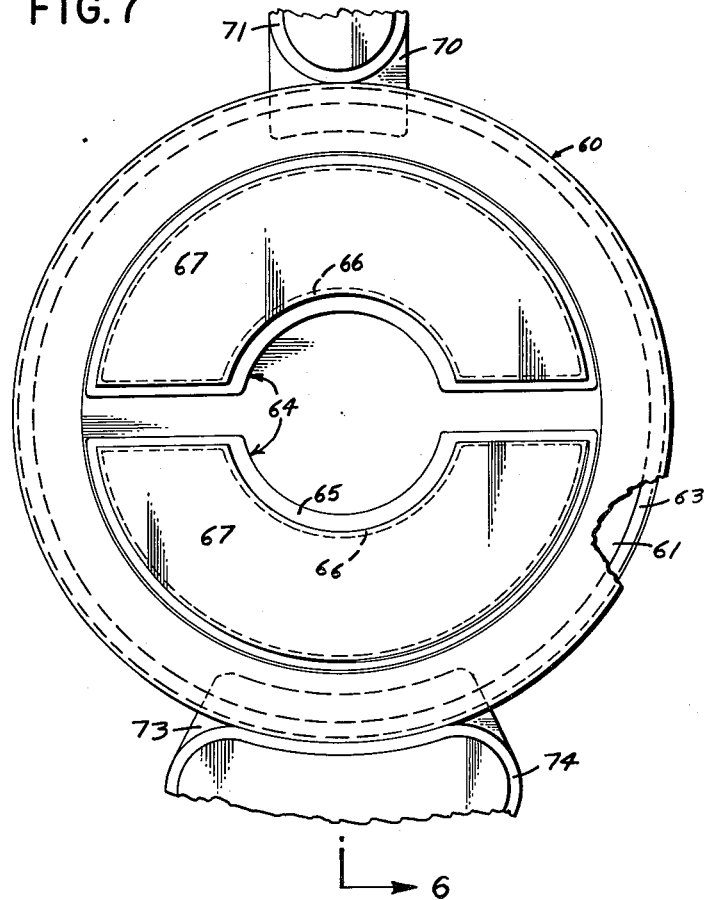

United States Patent Office 3,000,533
Patented Sept. 19, 1961

3,000,533
ENGINE INLET PLUG
Marvin S. Jodock, Seattle, Wash., assignor to William
E. Rockhill and Arthur D. Peterson, doing business as
Globe Plastic Company, Seattle, Wash.
Filed Apr. 24, 1959, Ser. No. 808,705
4 Claims. (Cl. 220—24.5)

This invention is for an engine-inlet plug and which plug is used to plug the air-intake sections of certain types of engines when the engines are not being used.

Certain types of engines used on airplanes, i.e., engines which operate on an expanding gas principle such as the gas-turbine engine and the ram-jet engine, present an attractive receptacle, when not in use, for odds and ends. More particularly, the gas-turbine engine as normally employed today has three air-intake sections: viz., an air-intake section for the engine, and an air-intake section for the oil cooler of the engine proper, an air-intake section for the air-conditioning unit for the engine. With the airplane standing on the field a passerby has the temptation to toss odds and ends such as an apple core, a banana peel, a rock or a nut and bolt into one of the air-intake sections. In many instances these odds and ends do not damage the engine while in other instances, e.g., rocks and nuts and bolts, can cause considerable damage. To preclude such damage there has been used solid plugs comprising extra heavy plywood such as seven and nine ply plywood. The cowling associated with the engine is fitted with special fittings to coact with fittings on the plywood. As the air-intake section for the engine proper is large the corresponding plywood must be large. As a result the plywood plug is bulky and is difficult to install. In fact, two men have been required to install one of the plugs. Also, because of the nature of the plug the same is relatively difficult to store when not in use and requires considerable storage space. Also, because of the nature of the plug and the fittings, special care must be used not to damage the cowling when installing and removing the cowling. In addition to these undesirable features of the plywood plug is its relatively high cost.

Accordingly, I have invented an engine inlet plug of flexible material which can be positioned by one man in the air-intake section of an engine so as to preclude the entrance of extraneous materials therein.

It is an object of this invention to provide an engine inlet plug which can be installed by one man.

Another object is the provision of an engine-inlet plug which can be folded to occupy a relatively small volume in comparison to its volume when in use.

A further object is to provide an engine-inlet plug which is sufficiently light in weight to be carried in flight on the airplane.

A still further object is the provision of an engine-inlet plug which can be installed and removed from the engine without damage to the engine.

An additional object is the provision of an engine-inlet plug which is relatively inexpensive to manufacture.

These and other objects and advantages will be more completely brought forth in the following detailed description, drawings and the claims.

Figure 4:
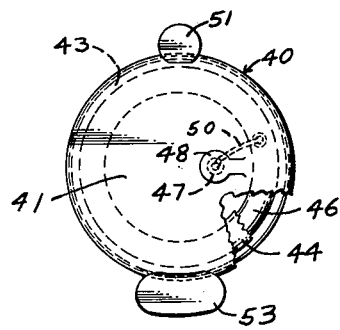
FIGURE 4 is a head-on view of another preferred version of the engine-inlet plug.
Figure 5:
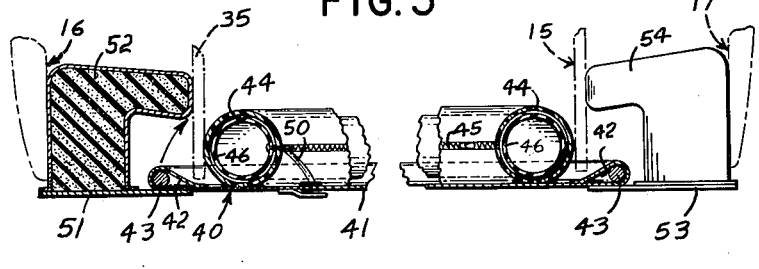

FIGURE 5, on an enlarged scale, is a fragmentary cross-sectional view of the engine-inlet plug depicted in FIGURE 4.

FIGURE 6 is a fragmentary cross-sectional view of another desirable version of the engine-inlet plug; and, FIGURE 7, on an enlarged scale, is a rear head-on view taken on line 7—7 of FIGURE 6 and illustrates the engine-inlet plug.

Figure 1:
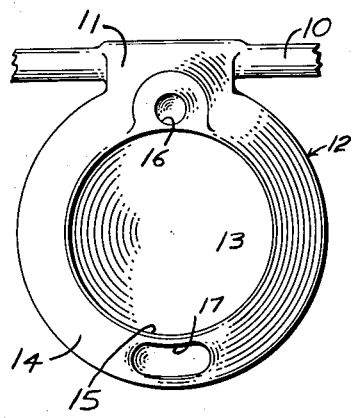
FIGURE 1 is a head-on view of a jet engine in a nacelle suspended from a wing and depicts an air-intake section for the engine proper, a lower air-intake section associated with an oil cooler and an upper air-intake section associated with an air-conditioning unit for the engine.
Figure 2:
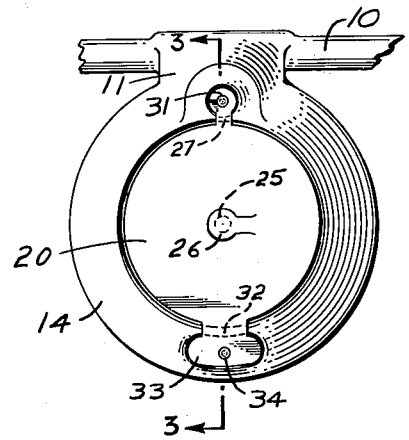
FIGURE 2 is a head-on view of a preferred version of the engine-inlet plug in position in the air-intake section, the air-conditioning-intake section, and the oil-cooling air-intake section of a jet engine.
Figure 3:
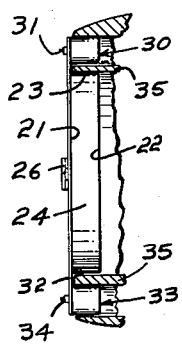
FIGURE 3 is a fragmentary vertical cross-sectional view taken on line 3—3 of FIGURE 2 illustrating the engine-inlet plug in position in the engine.

Referring to the drawings it is seen that FIGURE 1 illustrates an airplane wing 10 connecting by means of a hanger 11 with an engine nacelle 12, said nacelle is a gas-turbine engine 13. The nacelle 12 comprises cowling 14 having a large aperture defining an air-intake section 15 for the engine; a small upper aperture defining an air-intake section 16 for air-conditioning the engine 13; and, a small generally kidney shaped lower aperture defining an air-intake section 17 for air-cooling oil used in the engine.

The invention comprises an engine-inlet plug 20 which, in the expanded state cofits in the air-intake section 15. This plug comprises a front-circular panel 21, a back-circular panel 22 and a panel 23 connecting the panels 21 and 22 at their peripheries to form an expandible plug 24. The panel 23 connects with the panels 21 and 22 in a fluid-tight seal so that the plug 24 can retain a fluid such as a gas or a liquid under pressure. In the front-circular panel 21 is a valve stem 25 for introducing the fluid into the plug 20. There is a protective flap 26 over the valve stem 25.

Connecting with the periphery of the front-circular section 21 by means of a connecting hinge 27 is a cylindrically shaped plug 30. This plug 30 cofits with the air-intake section 16. In the front face of the plug is a valve 31 for introducing the fluid into the plug 30.

Connecting with the periphery of the front-circular section 21 by means of a connecting hinge 32 is a plug 33. This plug cofits with the air-intake section 17. In the front face of the plug is a valve 34 for introducing the fluid into the plug 33.

The engine-inlet plug 20 is of a flexible material which can be folded back on itself. A desirable flexible material is a reinforced plastic such as polyvinylchloride having a weight of approximately 13.5 ounces per square yard. Other suitable flexible materials are polyester such as Mylar and polypropylene. As is readily appreciated the plug 24, in a deflated state, is placed in the air-intake section 15 and inflated. With sufficient inflation the plug 24 expands outwardly towards the partition 35 in the cowling 14 and, in effect, grips the cowling by a fraction fit so as to be positioned therein. Similarly, the plugs 30 and 33 are inflated so as to grip by friction the cowling of the air-intake sections 16 and 17.

In FIGURES 4 and 5 there is presented another desirable engine inlet plug 40 comprising a circular flexible sheet-like partition 41. The circumferential section folds back on itself to form a loop 42, whose circumferential edge is bonded to the back face of the partition 41. In this loop 42 is a circular stay 43. This stay is flexible so as to be twisted and bent without being permanently deformed. This stay, for example, may be of spring steel. The stay is also of a larger diameter than the diameter of the engine air-intake section 15 so as to encircle the cowling surrounding this engine air-intake section. As is readily appreciated this precludes the forcing in of the engine air-inlet plug 40 into the engine air-intake section.

Also, on the hidden or backside of the plug 41 is a toroidal shaped tube 44 having a zipper 45 for opening and closing the tube. Inside of this tube 44 is an inflatable tube 46 such as an inner tube for an automobile tire. The tube 46, in a deflated state, is of a smaller external diameter than the internal diameter of the air-intake 15 as defined by the cowling partition 35. Upon inflation the tube 46 expands, and if free to do so, to a diameter larger than the internal diameter of the air-intake section 15. When in position in the air-intake section the expanded tube 46 inside of the casing tube 44 forces the casing tube against the partition 35 so as to position the plug.

In the circular section 41 there is an opening 47 and which opening is covered by a flap 48 on the exposed surface or face. This opening 47 leads to a valve stem 50 which connects with the tube 46.

Attached to the circular section 41 on its periphery is a flap 51 having on its hidden face a flexible and compressible plug 52 for cofitting in air-conditions air-intake section 16.

Also attached to the circular section 41 on its periphery is a flap 53 having on its hidden face a flexible plug 54 and compressible plug for cofitting in oil-cooling air-intake section 17.

These flexible and compressible plugs 52 and 54 are of a somewhat larger peripheral dimension than the internal peripheral dimension of the corresponding air-intake section. Therefore, the plug has to be squeezed into the air-intake section. Due to the compressive and expansive nature of the plug the same expands against the wall so as to position itself in the air-intake section.

The circular section 41, the tube 44, the flaps 51 and 53 and even the tube 46 are of a flexible material which can be folded such as polyvinyl chloride having a weight of approximately 13.5 ounces per square yard.

In position in the air-intake sections the circular section 41 and the flaps 51 and 53 function as membranes to preclude the introduction of extraneous objects into the air-intake sections.

Another preferred engine-inlet plug is 60 having a flexible circular central section 61. The circumferential edge of this section folds back upon itself and is bonded to itself to form a loop 62. In this loop is a stiffener band 63 and which band is flexible so as to be capable of being twisted and bent without being permanently deformed. This band is also of a larger diameter than the diameter of the engine air-intake section 15 so as to encircle the cowling surrounding this engine air-intake section. As is readily appreciated this precludes forcing in of the engine air-inlet plug 60 into the engine air-intake section.

Also, on the back face of the circular section 61 are two semicircular cup sections 64. These sections run through an arc of 180°. The section comprises a base 65 which circumscribes the section 64. This base rises into a wall 66 which in turn forms a top 67. In the wall are a number of breather holes 68.

The section 64 may be of molded rigid polyvinyl chloride having a thickness of greater than about 0.01 inch. With such a thickness the section 64 is rigid and yet flexible so as to be capable of being squeezed under pressure from an individual but with the removal of the pressure to resume its normal configuration. With this characteristic it is possible to force the section 64 into the air-intake section and for the section to stay in position.

On the face side of the circular section 61 and bonded near the periphery thereof is a flap 70. On the back face of this flap is a flexible cup 71 filled with a foam material 72.

Spaced approximately 180° from the flap 70 and also bonded to the circular section 61 near its periphery is a flap 73. On the back face of this flap is a flexible kidney-shaped cup 74 filled with a foam material 75.

The flexible cup 71 cofits with the air conditioning air-intake section 16 and the cup 73 cofits with the oil-cooling air-intake section 17.

In positioning the engine air-inlet plug 60 the two sections 64 can be pushed toward each other and placed in the engine air-intake section 15. With the release of pressure the two sections expand outwardly so as to bear against the cowling 35 and thereby position the plug. The cup 71 can be forced into the air-intake section 16 and the cup 73 can be forced into the air-intake section 17.

The circular section 61, the flap 70 and the cup 71, the flap 73 and the cup 74 function as membranes to preclude the entrance of extraneous material into the air-intake sections.

The circular section 61, the flap 70 and the flap 73 are of a flexible material which can be folded such as polyvinyl chloride having a weight of approximately 13.5 ounces per square yard.

As is seen from the preceding description of the engine-inlet plugs the same are easy to install; light in weight so as to be carried on the airplane; capable of being folded into a small volume; can be installed and removed without damage to the engine; and, can be manufactured relatively inexpensively.

Having presented a specific disclosure of my invention, what I wish to claim is:

1. A closure plug adapted to close the air inlet openings of a jet or similar aircraft engine having a relatively large main air inlet opening and two smaller openings adjacent the periphery of said large opening, said closure plug comprising; a central flexible and foldable panel generally circular in plan form, deformable first means connected to the periphery of said panel for applying tension forces thereto about said periphery to cause said panel to occupy substantially a single plane, second means separate from said first means and connected with said panel and including arcuately extending resilient wall means which extend at least in part substantially perpendicularly to said plane of said panel, said last mentioned means being foldable with said panel, said plug further comprising plug means at the periphery of said panel for closing said two smaller openings, whereby, said plug may be stored in a generally collapsed and folded state and may be unfolded for use to plug the openings of an engine or the like.

2. A closure plug adapted to close the air inlet openings of a jet or similar aircraft engine, said closure plug comprising; a flexible and foldable panel, deformable first means comprising a flexible and resilient hoop-like member connected to the periphery of said panel for applying tension forces thereto about said periphery to cause said panel to occupy substantially a single plane, plug-forming means separate from and disposed inwardly of said first means and connected with said panel and including resilient wall means a substantial part of the periphery of which extends at least in part substantially perpendicularly to said plane of said panel, said last mentioned means being foldable with said panel, whereby said plug may be stored in a generally collapsed and folded state and may be unfolded for use to plug the opening of an engine or the like.

3. The closure plug of claim 2, said plug-forming means comprising continuous inflatable tube means.

4. The closure plug of claim 2, said plug-forming means comprising plural cup sections.

References Cited in the file of this patent

UNITED STATES PATENTS

| | | |
|---|---|---|
| 1,158,622 | Blakeslee | Nov. 2, 1915 |
| 2,156,260 | Crothers | May 2, 1939 |
| 2,366,911 | Laird | Jan. 9, 1945 |
| 2,559,564 | Sperling | July 3, 1951 |
| 2,655,282 | Dunbar | Oct. 13, 1953 |
| 2,685,071 | McCreary | July 27, 1954 |
| 2,697,534 | Topley | Dec. 21, 1954 |
| 2,764,200 | Gits | Sept. 25, 1956 |
| 2,789,607 | Tupper | Apr. 23, 1957 |
| 2,857,933 | Lithum | Oct. 28, 1958 |
| 2,888,717 | Domitrovic | June 2, 1959 |

FOREIGN PATENTS

| | | |
|---|---|---|
| 507,976 | Germany | Sept. 22, 1930 |